United States Patent
Wong et al.

(10) Patent No.: US 11,683,769 B2
(45) Date of Patent: Jun. 20, 2023

(54) INFRASTRUCTURE EQUIPMENT, WIRELESS COMMUNICATIONS NETWORK, COMMUNICATION DEVICE AND METHODS

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 175 days.

(21) Appl. No.: 17/047,394

(22) PCT Filed: Apr. 12, 2019

(86) PCT No.: PCT/EP2019/059554
§ 371 (c)(1),
(2) Date: Oct. 14, 2020

(87) PCT Pub. No.: WO2019/201811
PCT Pub. Date: Oct. 24, 2019

(65) Prior Publication Data
US 2021/0168747 A1 Jun. 3, 2021

(30) Foreign Application Priority Data
Apr. 16, 2018 (EP) .................................. 18167615.6

(51) Int. Cl.
*H04W 56/00* (2009.01)
*H04W 52/02* (2009.01)
(52) U.S. Cl.
CPC ... *H04W 56/0015* (2013.01); *H04W 52/0216* (2013.01)
(58) Field of Classification Search
CPC .......... H04W 56/0015; H04W 52/0216; Y02D 30/70
See application file for complete search history.

(56) References Cited

U.S. PATENT DOCUMENTS

2010/0099358 A1 4/2010 Kumar et al.
2016/0227502 A1* 8/2016 Vos .................. H04W 56/0015
2020/0221416 A1 7/2020 Wong et al.

FOREIGN PATENT DOCUMENTS

WO 2018/202718 A1 11/2018
WO 2019/030337 A1 2/2019
(Continued)

OTHER PUBLICATIONS

Ericsson, "Revised WID for Further Enhanced MTC for LTE", 3GPP TSG RAN Meeting #73, RP-161464, New Orleans, USA, Sep. 19-22, 2016, 6 pages.
(Continued)

*Primary Examiner* — Eric Myers
(74) *Attorney, Agent, or Firm* — Xsensus LLP

(57) ABSTRACT

A method of operating a communications device to transmit data to or to receive data from a wireless communications network comprises detecting a first synchronisation signal at the communications device received via a wireless access interface of a cell of the wireless communications network, the first synchronisation signal being transmitted with a first periodicity with respect to a time divided structure of the wireless access interface, the first synchronisation signal being configured to carry an indication of an identifier of the cell, generating a first estimate of the cell identifier carried by the first synchronisation signal, and configuring a transmitter of the communications device to transmit data to the wireless communications network and configuring a receiver of the communications device to receive data from the wireless communications network based on the first estimated cell identifier.

16 Claims, 6 Drawing Sheets

(56) References Cited

FOREIGN PATENT DOCUMENTS

| WO | 2019/063479 A1 | 4/2019 |
| WO | 2019/158446 A1 | 8/2019 |
| WO | 2019/158603 A1 | 8/2019 |

OTHER PUBLICATIONS

Huawei, et al., "Revised work item proposal: Enhancements of NB-IoT", 3GPP TSG RAN Meeting #73, RP-161901, New Orleans, USA, Sep. 19-22, 2016, 8 pages.

Ericsson, "Reduced system acquisition time for MTC", 3GPP TSG-RAN WG1 Meeting #90bis, R1-1716995, Prague, Czech Republic, Oct. 9-13, 2017, 6 pages.

White Paper, "Coverage Analysis of LTE-M Category-M1", Contributing and Supporting Companies: Sierra Wireless, et al., Version 1.0, Jan. 2017, 20 pages.

Huawei, et al., "New WID on Further NB-IoT enhancements", #3GPP TSG RAN Meeting #75, RP-170852, Dubrovnik, Croatia, Mar. 6-9, 2017, 6 pages.

Harri Holma, et al., "LTE for UMTS OFDMA and SC-FDMA Based Radio Access", John Wiley and Sons, 2009, 4 pages.

Ericsson, et al., "New WID on Even further enhanced MTC for LTE", 3GPP TSG RAN Meeting #75, RP-170732, Dubrovnik, Croatia, Mar. 6-9, 2017, 4 pages.

Christian Hambeck, et al., "A 2.4μW Wake-up Receiver for Wireless Sensor Nodes with -71 dBm Sensitivity", IEEE, 2011, 4 pages.

International Search Report and Written Opinion dated Jun. 14, 2019 for PCT/EP2019/059554 filed on Apr. 12, 2019, 12 pages.

Sony, "Considerations on eSS for efeMTC", 3GPP TSG RAN WG1 Meeting No. 92bis, R1-1804602, Sanya, China, Apr. 16-20, 2018, 6 pages.

Sony, "MTC Synchronisation Signal evaluations for efeMTC", 3GPP TSG RAN WG1 Meeting No. 91, R1-1720465, Reno, USA, Nov. 27-Dec. 1, 2017, 6 pages.

* cited by examiner

INFRASTRUCTURE EQUIPMENT, WIRELESS COMMUNICATIONS NETWORK, COMMUNICATION DEVICE AND METHODS

CROSS-REFERENCE TO RELATED APPLICATIONS

The present application is based on PCT filing PCT/EP2019/059554, filed Apr. 12, 2019, which claims priority to EP 18167615.6, filed Apr. 16, 2018, the entire contents of each are incorporated herein by reference.

BACKGROUND

Field of Disclosure

The present disclosure relates to infrastructure equipment which form part of a radio access network of a mobile communications network, which are configured to transmit synchronisation signals to communications devices for the communications devices to synchronise with a wireless access interface provided by the radio network part of the wireless communications network in order to transmit or to receive data. The present technique also relates to communications devices configured to synchronise with a wireless communications network in order to transmit or to receive data via the wireless communications networks and method of the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of communications devices associated with different traffic profiles gives rise to new challenges for efficiently handling communications in wireless telecommunications systems that need to be addressed, particularly, but not exclusively, in respect of low power devices.

SUMMARY OF THE DISCLOSURE

The present disclosure can help address or mitigate at least some of the issues discussed above as defined in the appended claims.

Embodiments of the present technique can provide a method of operating an infrastructure equipment in a wireless communications network, the method comprising providing a wireless access interface by the infrastructure equipment to form a cell of the wireless communications network, the infrastructure equipment forming part of a radio access network of the wireless communications network. The method further comprises transmitting with a first periodicity with respect to a time divided structure of the wireless access interface a first synchronisation signal to one or more communications devices within the cell formed by the infrastructure equipment, the first synchronisation signal being configured to carry a first indication of an identifier of the cell which is detectable by one or more communications devices for acquiring synchronisation with the time divided structure of the wireless access interface. The method further comprises transmitting with a second periodicity with respect to the time divided structure of the wireless access interface an enhanced synchronisation signal within the cell. The enhanced synchronisation signal carries a second indication of the identifier of the cell which is detectable by the communications devices for acquiring synchronisation with the time divided structure of the wireless access interface. The second periodicity is different to the first periodicity and the enhanced synchronisation signal is formed from one of a set of detectable sequences, each detectable sequence of the set representing one of a set of possible cell identifiers or one or more other signalling indications for the communications devices.

Embodiments of the present technique can provide an infrastructure equipment which transmits an enhanced synchronisation signal in addition to a first synchronisation signal. The first synchronisation signal may be for example a conventional or legacy synchronisation signal such as that specified in 3GPP LTE as the primary synchronisation signal (PSS) and secondary synchronisation signal (SSS), which together convey the physical cell identifier (PCID) of the cell. However, detecting the PSS and the SSS can take a relatively long time. Communications devices need to acquire the PCID before they can detect system information which is required to configure their transmitters and receivers to transmit or receive data via the wireless access interface. Communications devices such as MTC or IoT devices may be configured to enter long discontinuous reception cycles in order to conserve power. As a result, when such devices come out of a DRX cycle they may have lost synchronisation due to clock drifts and/or moved to a different cell, therefore requiring them to re-acquire synchronisation and detect the PCID of the cell in which they wish to communicate. However using a conventional (first) synchronisation signal such as a PSS/SSS to re-synchronise with the wireless access interface can take a relatively long time therefore causing a drain of battery life. For this reason it has been proposed to transmit an enhanced synchronisation signal from each cell, which is formed by or configured to carry one of a predetermined set of sequences. The sequences may be formed from a combination of a Zadoff-Chu sequence and a PN sequence. Each sequence of the set can identify one of the PCID. Furthermore embodiments of the present technique can provide one or more additional or other sequences which are used to identify other signalling indications, which can be used by the communications devices to efficiently detect other information items or types as secondary information. Examples of such other signalling indications can include a system information change notification, wake-up signalling related information, or an access class barring indication.

According to another aspect of the present technique, there is provided a method of operating a communications device to transmit data to or to receive data from a wireless communications network comprises detecting a first synchronisation signal at the communications device received via a wireless access interface of a cell of the wireless communications network. The first synchronisation signal is transmitted with a first periodicity with respect to a time divided structure of the wireless access interface, the first synchronisation signal is configured to carry an indication of an identifier of the cell. The method further comprises generating a first estimate of the cell identifier carried by the first synchronisation signal, and configuring a transmitter of the communications device to transmit data to the wireless communications network and configuring a receiver of the communications device to receive data from the wireless communications network based on the first estimated cell identifier. The method further comprises detecting an enhanced synchronisation signal received via the wireless access interface with a second periodicity with respect to the time divided structure of the wireless access interface, the enhanced synchronisation signal being formed from one of a set of detectable sequences, each detectable sequence of the set representing one of a set of possible values of a first information type or one or more other signalling indications for the communications device, detecting from the enhanced synchronisation signal one of the detectable sequences from which the enhanced synchronisation signal has been formed, and using the detected sequence from the enhanced synchronisation signal to re-configure one or both of the transmitter and the receiver of the communications device to transmit data to the wireless communications network or to receive data from the wireless communications network. The first information type may be a cell identifier.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
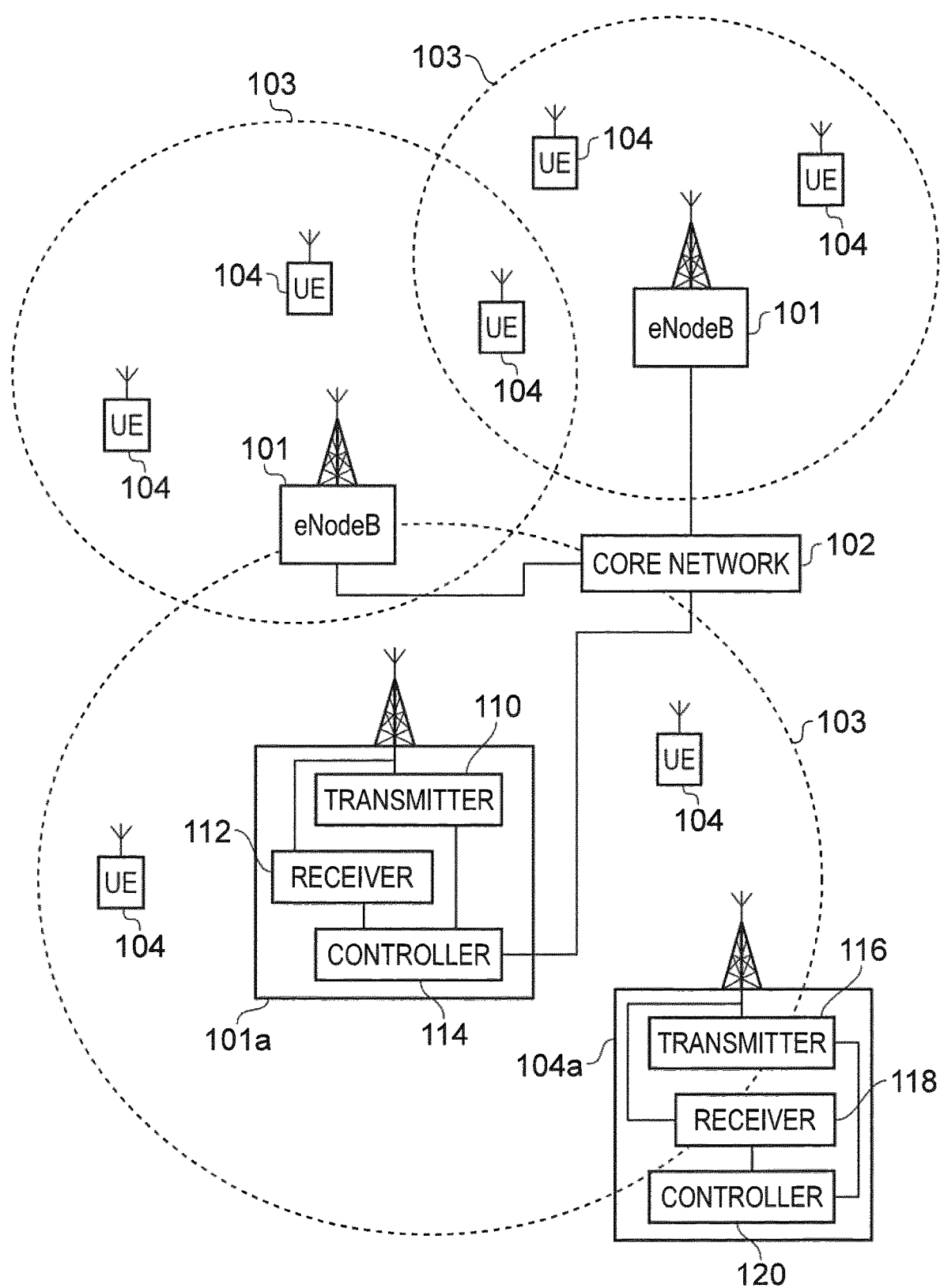
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [13]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB/eNB), a general Node B (gNodeB/gNB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface.

The core network 102 may also provide functionality including authentication, mobility management, charging and so on for the communications devices served by the network entity. The mobile communications devices of FIG. 1 may also be referred to as communications terminals, user equipment (UEs), communications devices, terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) or 5G/New Radio (NR) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

In this example, the infrastructure equipment 101a comprises a transmitter 110 for transmission of wireless signals, a receiver 112 for reception of wireless signals and a controller 114 configured to control infrastructure equipment 101a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 114 may provide the scheduling function for the base station.

An example UE 104a is shown in more detail to include a transmitter 116 for transmitting signals on the uplink of the wireless access interface to the eNodeB 101 and a receiver 118 for receiving signals transmitted by the base station 101 on the downlink via the wireless access interface. The transmitter 116 and receiver 118 are controlled by a controller 120. In the embodiments of the present disclosure, the UE 104a is a communications device configured to operate using efeMTC (Even Further Enhanced Machine Type Communications) or feNB-IoT (Further Enhanced Narrowband Internet of Things). The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the communications device 104a will in general comprise various other elements associated with its operating functionality, for example a power source, user interface, and so forth, but these are not shown in FIG. 1 in the interests of simplicity.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link of a wireless access interface according to an LTE standard is presented in FIG. 2.

Figure 2:
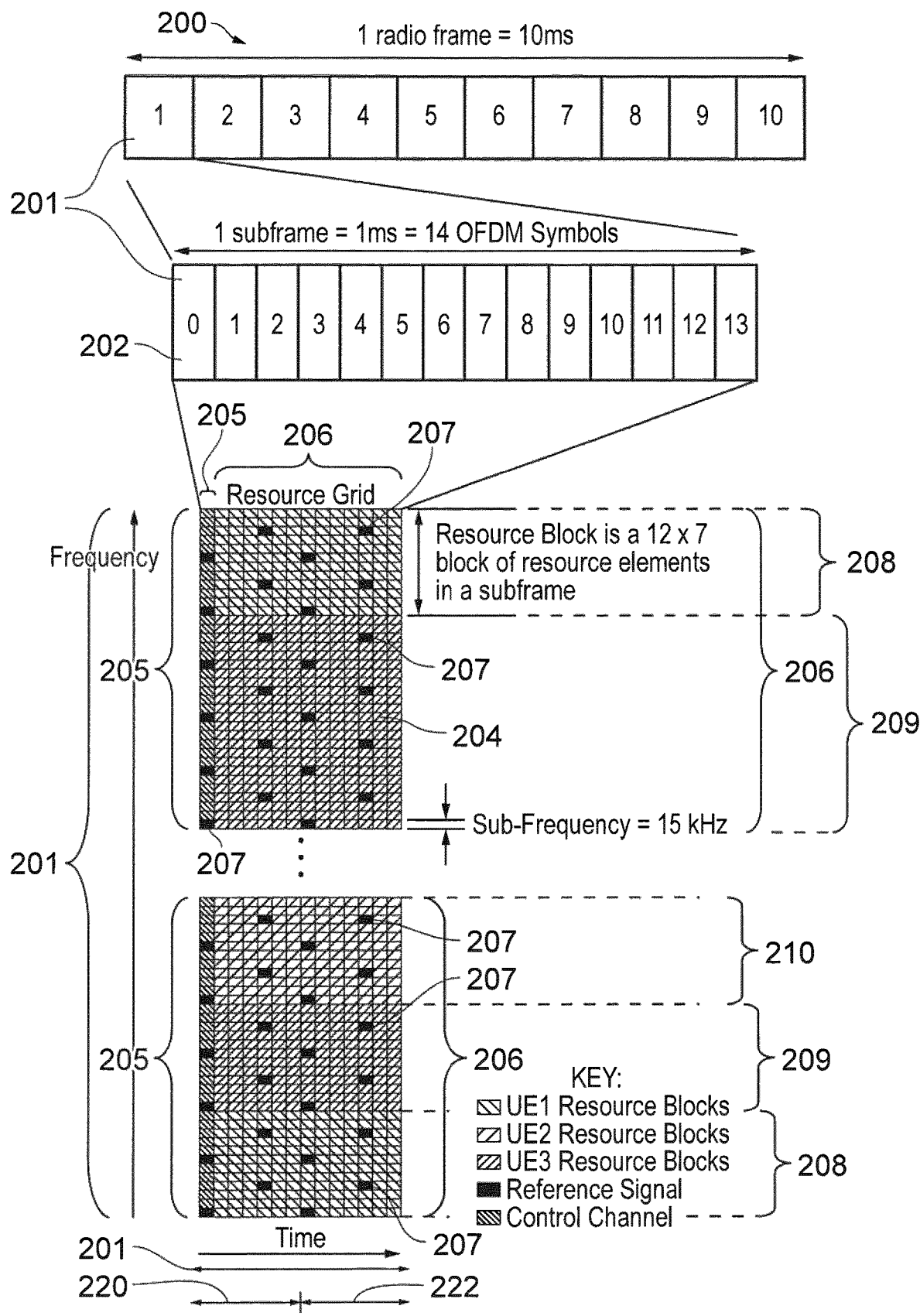
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data. The number of subcarriers varies between 72 subcarriers (1.4 MHz) and 1200 subcarriers (20 MHz). In some examples the subcarriers are grouped to form scheduling blocks. A resource block (RB) can consist of 12 sub-carriers. A narrowband in MTC can consist of 6 RBs or 72 subcarriers. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resource blocks 203 each comprising 12 subcarriers for the duration of one slot and the resource blocks further divided into resource elements 204 which span one subcarrier for one OFDM symbol, where each rectangle 204 represents a resource element. The frame structure also contains primary synchronisation signals (PSS) and secondary synchronisation signals (SSS): not shown in FIG. 2. The PSS occupies the central 62 subcarriers of the $7^{th}$ OFDM symbol of the first subframe and the 7th OFDM symbol of the $6^{th}$ subframe of the radio frame. The SSS occupies the central 62 subcarriers of the $6^{th}$ OFDM symbol of the first subframe and the central 62 subcarriers of the $6^{th}$ OFDM symbol of the $6^{th}$ subframe of the radio frame.

Before a terminal can use a cell provided by a base station, the terminal is expected to carry out a series of steps. For example, a terminal may be in a situation where it has not yet achieved synchronisation after a long DRX period or after having being switched on. A terminal would be expected to detect the cell and cell-ID using the Primary Synchronisation Signal (PSS) and Secondary Synchronisation Signal (SSS), and then receive the System Information (MIB) from the Physical Broadcast Channel (PBCH) and further System Information from the PDSCH. More specifically a terminal would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1-BR that is transmitted via the PDSCH. SIB1-BR contains scheduling information for acquiring the remaining System Information portions (other SIBs).

As mentioned above, the cell ID is carried by the PSS in combination with the SSS. There are five hundred and four (504) possible cell IDs which are signalled by the PSS and the SSS. These are divided into three groups of one hundred and sixty eight (168) cell IDs. The PSS identifies one of the three groups and the SSS identifies the cell ID of the cell from one of the one hundred and sixty eight cell IDs. Since the PSS is carrying a smaller amount of information the communications resources allocated to the PSS can be more appropriately designed for detection by UEs at lower signal to notice ratios than the SSS. The UE may be therefore more likely to acquire synchronisation with the network.

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Enhanced Synchronisation Signal

One application of MTC is to provide periodic reports, e.g. sensors, utility meters, where the reports or readings are transmitted infrequently, e.g. once every several hours or days. Hence in order to save battery power, such devices likely operate mostly in idle mode where they operate with long DRX cycles. When an MTC UE is put into long DRX it will lose synchronisation with the network and hence upon waking up from DRX (e.g. to monitor the Paging Occasion or perform a RACH), the UE needs to re-synchronise to the network and perform system acquisition (read the MIB and SIB). In the legacy system, the UE uses the legacy LTE PSS and SSS to achieve synchronisation and thereafter, the UE acquires the PBCH and then SIB1-BR. For a UE operating in coverage enhanced mode, these re-synchronisation and system acquisition operations are notoriously slow as numerous repetitions are required to be able to decode the PBCH and PDSCH channels carrying the System Information. Example estimates of the expected acquisition times for the PSS/SSS, PBCH (MIB) and SIB1 are shown in Table 1, which is reproduced from [5], for a deep coverage scenario.

TABLE 1

| Estimated 90% acquisition time at 164 dB MCL (maximum coupling loss) | |
| --- | --- |
| Channel | 90% Acquisition Time (ms) at 164 dB MCL |
| PSS/SSS | 850 |
| PBCH (MIB) | 250 |
| PDSCH (SIB1-BR) | 750 |

Figure 3:
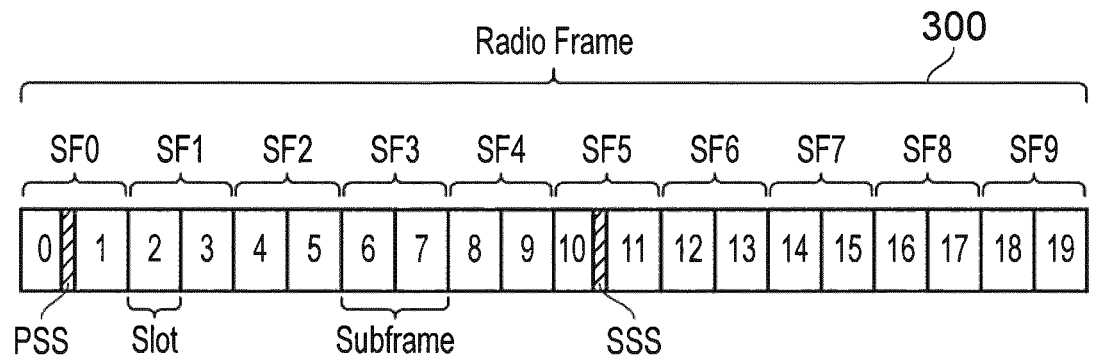
FIG. 3 schematically represents the transmission of the synchronisation signals in an FDD LTE system.

Legacy terminals (MTC terminals or otherwise) use the existing PSS/SSS which occupy only 1 OFDM symbol each and are transmitted sparsely; twice every radio frame. This is illustrated in FIG. 3 which represents the transmission of the synchronisation signals in an FDD LTE system, where it can be seen that the PSS and SSS each occupy a single OFDM symbol every 5 ms, where a radio frame is 10 ms. As shown in FIG. 3 boxes shown along a horizontal axis represent a transmission of ten subframes SF0 to SF9 in time which form a radio frame 300. Each of the sub-frames SF0 to SF9 is comprised of two slots as shown for example for one sub-frame SF3. There are therefore twenty slots numbered 0 to 19. As shown in FIG. 3 a PSS is transmitted in the last OFDM symbol of Slot 0 (Subframe 0) and the SSS is transmitted in Slot 10 (Subframe 5). Hence, an additional or enhanced Synchronisation Signal for MTC (eSS) has been agreed in 3GPP for efeMTC to increase the density of available synchronisation signals so that the MTC UE can use them to shorten its time to re-sync to the network. It should be noted that in our co-pending European patent application number 18157021.9 [10] the contents of which are herein incorporated by reference the eSS is referred to as an MTC Synchronisation Signal (MSS).

It has been proposed in 3GPP that the eSS would indicate the Physical Cell ID (PCID) of the serving cell. This enables the UE that wakes up from a long sleep to ensure that it is still in the same cell and has not drifted into another cell. Indicating the PCID would also enable eSS to be used for neighbour cell measurement.

Figure 4:
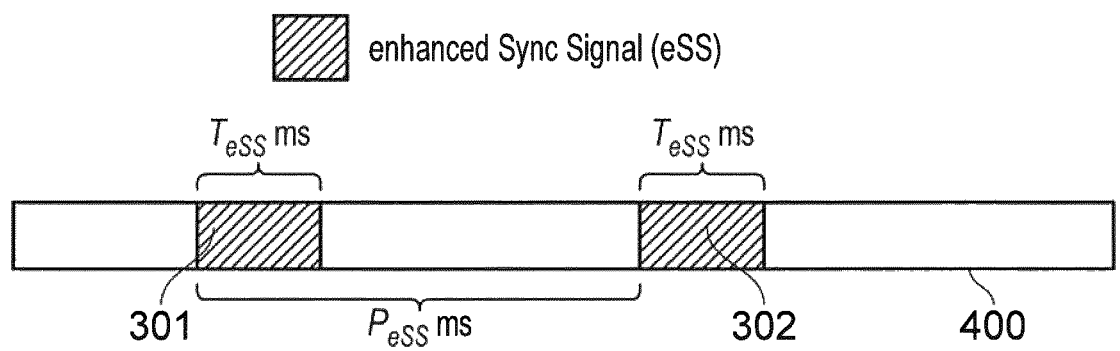
FIG. 4 illustrates an example of how an enhanced synchronisation signals (eSS) can be intermittently transmitted.

An example illustration of a transmission of an enhanced synchronisation signal (eSS) is shown in FIG. 4. FIG. 4 provides within a box 400 an example of a transmission of two eSS 301, 302. The box 400 is arranged along the horizontal axis to represent time. Each of the eSS signals 301 and 302 are transmitted within a shaded box 301, 302 to represent the duration of the eSS. As indicated by the example illustrated by FIG. 4, the eSS can be transmitted in a bursty manner, so that it can be for example transmitted densely for $T_{eSS}$ ms every $P_{eSS}$ ms [6], for example $T_{eSS}$ can be 10 to 20 ms and $P_{eSS}$ can be 100 ms to 3 seconds. The burst interval $T_{eSS}$ and periodicity $P_{eSS}$ is configurable thereby allowing the eNB to control the percentage of resources used for eSS.

In our co-pending European patent application EP [7], the contents of which are herein incorporated by reference, there was disclosed an arrangement in which the eSS provides an indication that the system information (SI) has changed and therefore signals to the UE that it should reacquire the system information for the cell from the MIB and SIBs. That is, the eSS indicates whether the MIB and SIBs have changed and if they have not changed, the MTC UE can skip reading the MIB and SIBs which would save a significant amount of time and energy. However embodiments of the present technique provide an advantage based on an observation that MIB and SIB changes rarely occur and hence for the majority of the time the MTC UE will not need to re-acquire MIB and SIBs.

It has also been proposed that in addition to the PCID and indicating a change in the information carried by MIB/SIB, an eSS can provide other indications such as providing signals related to a wake-up signal for paging occasions, WUS, which will be described later and also information providing an indication of Access Barring, which informs some classes of UEs that they may not use a particular cell.

In one example, the eSS may be formed from a base sequence such as Zadoff-Chu sequence combined with a cover code which can be a pseudo-random number PN sequence (as defined in 3GPP specifications) or Gold sequence. In order to indicate two states, that can represent a binary '1' or '0' as 1 bit of information, using the eSS, two sequences are required. To minimise errors, these two sequences need to be as different as possible, in other words, they need to have a large Hamming or Euclidean distance so that they can be easily distinguished even when part of the sequences are corrupted. As indicated above, in one example of LTE the number of PCIDs is five hundred and four (504), which means that if the eSS were to convey the same number of PCIDs then the combination of different ZC and cover code sequences needs to provide 504 distinct states. In order to also provide an indication of a change of the information carried by the MIB/SIB, then for each PCID, the eSS would need to indicate whether there is also a MIB/SIB change, i.e. the number of states is doubled to 1008 states. The more states the sequence needs to provide, the higher the error probability in decoding the information indicated in the eSS. Hence an efficient method is required to indicate the proposed information to the UE using eSS. It will be appreciated that using a combination of Zadoff-Chu and Gold sequence is just one example of a sequence which can be used to indicate a state of the eSS and other sequences or combination of sequences can be used. Embodiments of the present technique are not therefore limited to a particular sequence or combination of sequences as long as the sequences can be used to represent different states which are used to indicate information to the UE.

As will be appreciated embodiments of the present technique are not limited to an eSS indicating one of five hundred and four (504) PCIDs, which is just an example and it will be appreciated that the eSS can indicate any number of PCIDs.

Signalling Additional Types or Items of Information in an eSS

Embodiments of the present technique can provide an eSS which is configured to not only indicate the PCID for the cell (the PCID for the cell is an example of a first type of information) but also indicate one or more other types of information (an example of such a second type of information is a SIB change notification) with additional states to the states indicating the PCID. However rather than the number of states being a multiple of the number of additional information types N and the number of PCIDs, the number of states signalled by the eSS is an addition of the number of PCIDs and the number of additional information types or items N. For the example of signalling the number of PCIDs for a current version of LTE, which is five hundred and four (504), the number of states would be increased to one thousand and eight (1008) if the eSS were to indicate an additional information item that there has been a change in the information carried by the MIB/SIB, whereas an eSS configured in accordance with an example embodiment would only require five hundred and five (505) states. Effectively therefore the eSS can indicate a plurality types of information or items by appropriately extending the number of states to the additional information types or items. When a second type of information is indicated as an additional state, then according to one example the second type of information is provided by a secondary signalling technique, the additional state therefore indicating that the UE should read the second type of information from the secondary signalling technique. For example, the second type of information can be a binary indication of whether the information conveyed by the MIB/SIB has changed. An additional state can be used (in addition to each state indicating one of the PCIDs) to indicate whether or not the MIB/SIB information has changed. If the MIB/SIB information has changed then the UE can detect the new MIB/SIB information from the MIB/SIB transmitted by the eNB in a conventional way, but if the MIB/SIB information has not changed then the UE does not need to waste power reading the MIB/SIB. In reading the MIB/SIB (upon change indication), the UE can determine the PCID (which is an example of the first type of information), for example based on decoding the PSS/SSS and/or a scrambling sequence applied to the MIB/SIB that is a function of PCID.

According to example embodiments of the present technique, each additional state (e.g. combination of ZC roots and cover code) carried by the eSS conveys only one type of information. Hence the number of states/sequences required to be conveyed by the eSS is not doubled if the types of information that can be indicated by the eSS is doubled.

According to the abovementioned example embodiment the eSS conveys the Physical Cell ID (PCID), which may be one of the five hundred and four (504) PCIDs via a combination of different base sequences and cover codes and an additional state as a second type of information which indicates that the information carried by the MIB or SIB has changed. The PCID is also provided by the SSS or implicitly provided by the MIB. An example of eSS states and their indication is shown in Table 2. Here the eSS would provide five hundred and five (505) different states where each state can be a combination of different base sequence (e.g. different ZC roots) and cover code. The UE will look for two possible states when decoding (or re-synchronising) to the eSS, i.e. the state representing the PCID of its serving cell and the $505^{th}$ state. For example if the UE is camped onto the Cell with PCID 2, the UE will attempt to decode the eSS assuming its sequence corresponds to a sequence indicating PCID 2, i.e. state 3 in Table 2 and a sequence indicating MIB/SIB change. If the UE detects the eSS using state 3, it will have verified that it is still in the same cell (the cell with PCID 2). If the UE detects the eSS using the $505^{th}$ state, then it knows that there is a MIB/SIB change. Since it is already synchronised it will then attempt to read the PCID using the PSS and SSS then read the MIB and SIB. The MIB is scrambled by a cell specific sequence and so the UE can alternatively skip the PSS and SSS and attempt to decode the MIB assuming that it is still in the same cell where it last verified its PCID. This is of course up to UE implementation. An example implementation of this embodiment is shown in FIG. 5.

Figure 5:
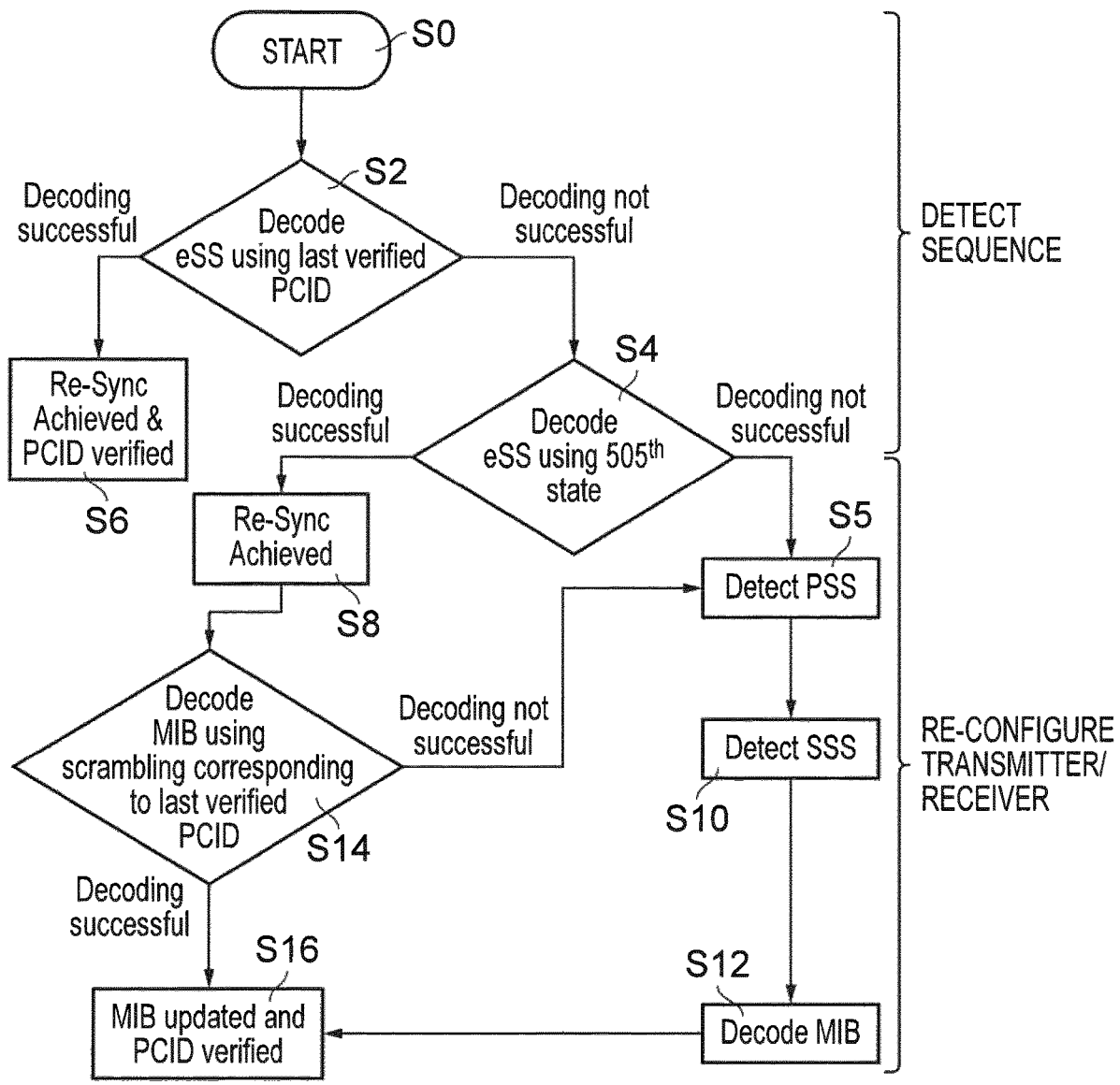
FIG. 5 is a flow diagram illustrating a process performed by a communications device in accordance with an embodiment of the present technique.

An example operation of a communications device or UE, which is configured to detect the PCID of a cell or the secondary information for example the indication of whether the MIB or SIB information has changed is shown in FIG. 5. As shown in FIG. 5 from a start S0 the UE detects the eSS by decoding the eSS with the sequence or state corresponding to that sequence for the PCID which the UE expects. For example the UE would assume that it is receiving signals from within the same cell which it last received signals. Accordingly in step S2 the UE reaches a decision point and determines whether or not it has detected the PCID which it detected for the cell. If it does not successfully detect the sequence corresponding to the PCID which it last verified then processing proceeds to decision point S4, otherwise processing proceeds to step S5

At decision point S4 the UE determines whether the eSS it decoded is for the 505th state. That is to say the UE attempts to detect the eSS using the sequence corresponding to the 505th state. If the UE is not successful then processing proceeds to step S6 otherwise processing proceeds to step S8.

If processing proceeds to step S6 in which the UE determines that it has not successfully detected the sequence from the eSS corresponding to the 505th state then the UE proceeds to perform a process in which it detects the PSS in order to regain synchronisation and then S10 the SSS in order to detect the PCID in the cell in which it is currently located. Then processing proceeds to step S12 in which the UE proceeds to detect the information for the cell from the MIB using the PCID.

If at step S6 the UE was successful in decoding the last verified PCID then the UE determines that it has achieved synchronisation and verified the current PCID.

At step S8, if the UE was successful in decoding the sequence corresponding to $505^{th}$ state then the UE determines that it has achieved resynchronisation with respect to the $505^{th}$ state. However the 505-state is an example of other signalling information (or a second type of information), which indicates that system information carried by the MIB or SIB has changed. Processing then proceeds to step S14.

At decision point S14 the UE then proceeds to decode the MIB using a scrambling code corresponding to the PCID associated with the cell that it had camped onto previously (i.e. at the last time that it had successfully read a PCID). If the UE is successful in decoding the information carried by the MIB using the scrambling corresponding to the last PCID then processing proceeds to step S16 in which the UE verifies that the system information has been updated and the PCID has been verified. If the UE is not successful in decoding the information carried by the MIB then processing proceeds to step S6 where the UE again detects the PSS and SSS which provides the indication of the PCID of the cell and processing then proceeds to decode the MIB information at step S12 as described above.

According to this technique, by providing one or more additional states or sequences carried by the eSS, in addition to each of the states or sequences corresponding to the set of possible PCIDs within the eSS, the additional states which have corresponding sequences which can be detected by the UE can provide an indication of additional other signalling information which the UE can use to more efficiently synchronise and gain system information or other information from the network.

As shown in FIG. 5 steps S0 to S4 can generally be identified as an operation of detecting the sequence carried by the eSS, whereas the steps S6 to S16 can generally be referred to as an operation of the UE re-configuring its transmitter or receiver. As will appreciated from this description, the UE firstly attempts to decode the eSS assuming a sequence corresponding to the last verified PCID. If it is successful then it has achieved re-sync and verified its PCID. If it is not successful it will attempt to decode the eSS using the $505^{th}$ state to see whether there is a MIB/SIB change. Depending on UE implementation, these two steps can of course be done in parallel. If the decoding is not successful then the UE has likely moved cell and will need to redo the sync process by reading the PSS, SSS and the MIB. If the decoding is successful using the $505^{th}$ state, then the UE would achieve re-sync and it can attempt to decode the MIB assuming the MIB is scrambled using a sequence corresponding to the last verified PCID. If it is successful then the UE would have updated its MIB and verified its PCID. If it fails to decode the MIB, it will attempt to read the PSS and SSS to determine the PCID and then decode the MIB again using the latest PCID. It should be appreciated that FIG. 5 is one example implementation and that other implementation is possible.

According to this example embodiment only five hundred and five (505) sequences or states are required to convey the cell ID and that there has been a change in the MIB/SIB information as compared to requiring one thousand and eight (1008) sequences or states to indicate the PCID and MIB/SIB change. After decoding the state-505 from the eSS, the UE can then verify the PCID through decoding the MIB, for example by successfully decoding the MIB using the scrambling sequence associated with the PCID of the last cell camped on. It should be appreciated that if 1008 sequences or states are used, if the sequence indicates that the MIB/SIB has changed the UE will still have to read the MIB/SIB anyway and so the example embodiment has reduced the number of sequences or states required without adding significant changes to the process.

According to some example embodiments the eSS may carry separate additional states for different SIBs or groups of SIBs. For example a first additional state 505 indicates that there has been a change in the information carried by the MIB, a second additional state 506 indicates a change in the information carried by SIB1-BR, and a third additional state 507 indicates that there has been a change in the information carried by one of the other SIBs such as for example SIB2 to SIB4 etc.

TABLE 2 eSS states and their indications

| eSS State/Sequence | Indication |
|---|---|
| 1 | Cell ID 0 |
| 2 | Cell ID 1 |
| 3 | Cell ID 2 |
| . | . |
| . | . |
| . | . |
| 504 | Cell ID 503 |
| 505 | MIB/SIB change |

According to another example embodiment the eSS is configured to include an additional item representing the MIB version or the SIB version. The MIB/SIB version is a way of indicating whether there is a change in the MIB/SIB in a conventional or legacy system. The UE basically checks the version it has with the version broadcasted to determine if there is a change in the MIB/SIB. However the number of versions of the MIB/SIB which are signalled may be limited to a predetermined number. The version of the MIB/SIB is cycled through this predetermined number. As such if a UE has not checked the MIB/SIB version number for some time, it may incorrectly determine that the MIB/SIB version has not changed because the number of versions signalled has cycled through the predetermined number of versions to signal the same version number even though the UE's MIB/SIB information is invalid. An example of this scenario is:
  there are 3 versions;
  the last time the UE checked, the MIB/SIB was in version 2;
  while the UE was asleep the MIB/SIB changed 3 times and hence the MIB/SIB then indicated version 2, even though the MIB/SIB has changed;
  the version still indicates version 2, even though the MIB/SIB has changed.

The UE will therefore wrongly assume that there is no change. This is typically mitigated by not changing the MIB/SIB too often and imposing a timer after which the UE must read the MIB/SIB. According to this example embodiment, in order to indicate the version of the MIB/SIB, an additional few sequences/states are required in the eSS to indicate the version. An example is shown in Table 3, where there are five hundred and seven (507) sequences/states provided by the eSS, where five hundred and four (504) sequences/states are used to indicate PCID and three sequences/states to indicate MIB/SIB version. Since the eSS can only transmit one sequence/state at a time, it cannot simultaneously indicate PCID and MIB/SIB version. Therefore according to this example embodiment, the different types of information are transmitted in a Time Division Multiplexing (TDM) manner, that is, the eSS would indicate the PCID for K consecutive eSS periods followed by the MIB/SIB version for L consecutive eSS periods. This example embodiment is illustrated in FIG. 6.

Figure 6:
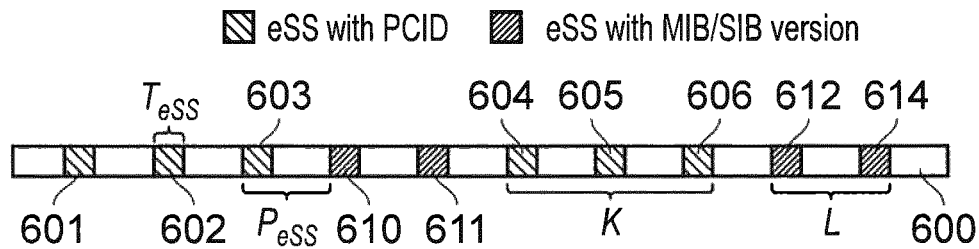
FIG. 6 is a graphical illustration representing a transmission of different versions of eSS in a time multiplexed manner in accordance with another example embodiment.

FIG. 6 provides an example illustration in which the sequence or state representing different versions of eSS carrying different types of information is time multiplexed. In FIG. 6, within a horizontal box 600, there is shown different eSS transmissions at different times carrying different information. In lighter shaded boxes 601 to 606 the eSS transmissions are known to transmit the PCID. However in the darker shaded boxes 610 to 614 the eSS transmits the MIB/SIB version number. According to this example embodiment therefore the eNB 101 is configured within the network to transmit an eSS with a periodicity of $P_{eSS}$ and transmission duration of $T_{eSS}$. Here K=3 and L=2, so for every K eSS transmissions where the PCID is indicated by the eSS, L eSS transmissions indicating the MIB/SIB version are transmitted. This recognises that MIB/SIB typically change very slowly (e.g. in a few hours or days) and so there is no need to indicate the MIB/SIB version in every eSS. During the L eSS transmissions where the eSS indicates the MIB/SIB version, the UE can obtain the PCID (if required) via secondary means for example from the PSS and SSS in accordance with a conventional arrangement or the UE just waits for the next K eSS transmissions cycle. The UE will use the sequence/state corresponding to its last known (i.e. stored) MIB/SIB version to try to detect the eSS during these L eSS transmissions since the MIB/SIB rarely changes. Similarly, during the K eSS transmissions, the UE attempts to re-synchronise by detecting the eSS using its last verified PCID since it is unlikely to have changed cell. The value of K is likely larger than the value of L since the event represented by the L eSS (i.e. MIB/SIB version change) rarely occurs. According to this example embodiment the transmission of the eSS carrying a state of sequence representing a different type of information is matched to the relative frequency that that type of information will change. This is because, the UE knows that during K eSS, the eSS will only indicate PCID and during L eSS the eSS will only indicate MIB/SIB version (i.e. one of the 3 different MIB/SIB version). When in L eSS, the UE will use the most likely MIB/SIB version to try to detect the eSS, whereas in the previous embodiment, the eSS can indicate PCID or an indication that MIB/SIB has changed. Hence in the previous embodiment, there is no need to apply the time division multiplexing according to this example embodiment, and so without the requirement for time division multiplexing, the UE will start off with the PCID first since MIB/SIB rarely changes.

TABLE 3 eSS states to indicate MIB/SIB version

| eSS State/Sequence | Indication |
|---|---|
| 1 | Cell ID 0 |
| 2 | Cell ID 1 |
| 3 | Cell ID 2 |
| . | . |
| . | . |
| . | . |
| 504 | Cell ID 503 |

TABLE 3-continued eSS states to indicate MIB/SIB version

| eSS State/Sequence | Indication |
| --- | --- |
| 505 | MIB/SIB version 1 |
| 506 | MIB/SIB version 2 |
| 507 | MIB/SIB version 3 |

As will be appreciated, using the state or sequence space to transmit different types of information in a time multiplexed manner can be extended to include more than two types of information or information items so that three of more types of information can be conveyed. The use of time multiplexing can provide an advantage of providing an efficient and robust technique for transmitting different types of information with more than one value, which requires more than one sequence to indicate, whilst reducing a possible increase in detection error by minimising an increase in the state/sequence space.

Wake-Up Signal (WUS)

In another example embodiment, the additional type of information provides a wake-up signal (WUS) or WUS related information. The techniques relating to WUS for signalling to UEs that they should activate their receivers in advance of a paging occasion are disclosed in our co-pending European patent applications numbered EP17193861 [8] and EP18157017 [9] the contents of which are herein incorporated by reference. Examples of WUS related information can be found in our recently filed patents in [8] and [9]. However, in order to appreciate this example embodiment of the present technique the techniques disclosed in [8] and [9] will be briefly explained in the following paragraphs with reference to FIGS. 7 and 8.

In a typical currently deployed network, idle mode communications devices (UEs) are configured to monitor for paging messages periodically. For communications devices operating in a discontinuous reception (DRX) mode this occurs when they wake up for their DRX awake time. Paging signals for a specific communications device are transmitted in defined frames (Paging Frames)/sub-frames (Paging Occasions) which for a given communications device may be derived from the International Mobile Subscriber Identifier (IMSI) of the communications device, as well as paging related DRX parameters established in system information transmitted within the network.

Figure 7:
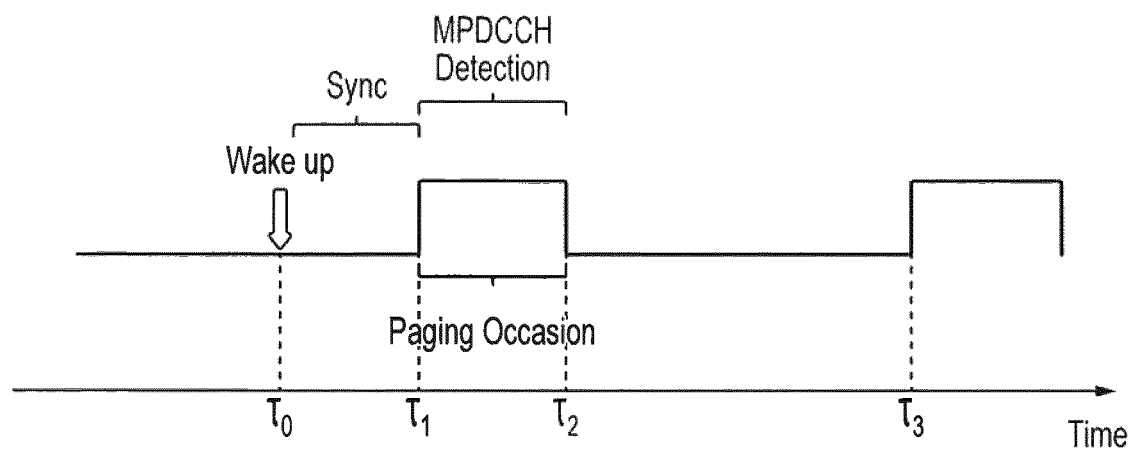
FIG. 7 provides a graphical illustration of a timing diagram representing a timing for transmitting a wake up signal before a paging occasion according to a previously proposed arrangement.

FIG. 7 schematically represents a timeline of a paging occasion for a communications device operating in a known wireless telecommunications system. In the example shown in FIG. 7, one paging occasion is shown and extends from time t1 to t2. As is conventional, paging occasions for a communications device will typically occur according to a regular repeating schedule having regard to the communications device's currently configured DRX cycle. Different communications devices may have different DRX cycle lengths, and so have different times between paging occasions. For a communications device having a relatively long DRX cycle/time between paging occasions, it is possible the communications device will to some extent lose synchronisation with the radio network infrastructure equipment of the telecommunications system between paging occasions. In this case it may be helpful for the communications device to wake up in advance of the paging occasion to allow it to synchronise to the wireless telecommunications system prior to the paging occasion. An example of this is schematically shown in FIG. 7 in which the communications device wakes up at time t0 so that it can synchronise with the wireless telecommunication system in the period between times t0 and t1 so that it is able to monitor/detect MPDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree of synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the communications device may become significantly offset relative to that of the radio network infrastructure).

Once the communications device has re-synchronised to the network, it will monitor MPDCCH to determine if there is a paging message, and if so will go on to decode the PDSCH carrying the paging message in the usual way. If there is no paging message for the communications device, the communications device will go back to sleep (low power mode) until the next paging occasion. For certain types of communications devices, such as MTC devices, it may be expected that paging will occur relatively rarely (e.g. once per day for a smart utility meter), and so in many cases the communications device may wake up and synchronise to the network to monitor MPDCCH by blind decoding for a potential DCI that may schedule a PDSCH containing a paging message when in fact there is no DCI or paging message for the communications device. This represents an undesirable "waste" of resources, for example battery power, for the communications device.

Previously proposed approaches for eNB-IoT and feMTC in accordance with 3GPP release 15 share several common objectives, and one of these objectives is to reduce power consumption associated with monitoring for paging messages by introducing what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [11], or of a type defined in a co-pending European patent application, with application Ser. No. 17/186,065.3 [12], the contents of which are hereby incorporated by reference. The proposed WUS is carried on a new physical channel and is intended to allow communications devices to determine whether or not they need to actually decode MPDCCH in an upcoming paging occasion. That is to say, whereas in accordance with previously proposed techniques a communications device is required to decode MPDCCH during every paging occasion to determine if there is a paging message, and if so to decode PDSCH to determine if the paging message is addressed to the communications device, the WUS is instead intended to indicate to the communications device whether or not the next paging occasion contains a paging message that the communications device should decode.

A WUS is transmitted at a pre-determined/derivable time in advance of a scheduled paging occasion such that a communications device knows when to seek to receive a WUS and may contain relatively little information so that it can be decoded quickly (as compared to the blind decoding needed for MPDCCH). For example, in some implementations the WUS may include a one-bit indication of whether or not there will be a paging message transmitted in the upcoming paging occasion. In other implementations the presence and absence of the WUS provide the indication. If the WUS indicates (e.g. using a bit or is detected to be present) the upcoming paging occasion does include a paging message, any communications devices for which that paging occasion applies may proceed to decode the paging message as normal to determine if the paging message is addressed to it. If the WUS (e.g. absence of a WUS) indicates the upcoming paging occasion does not include any paging message, any communications device for which that paging occasion applies can determine from this that it does not need to monitor for a paging message during the upcoming paging occasion, and so can, for example, return to a low power mode.

Figure 8:
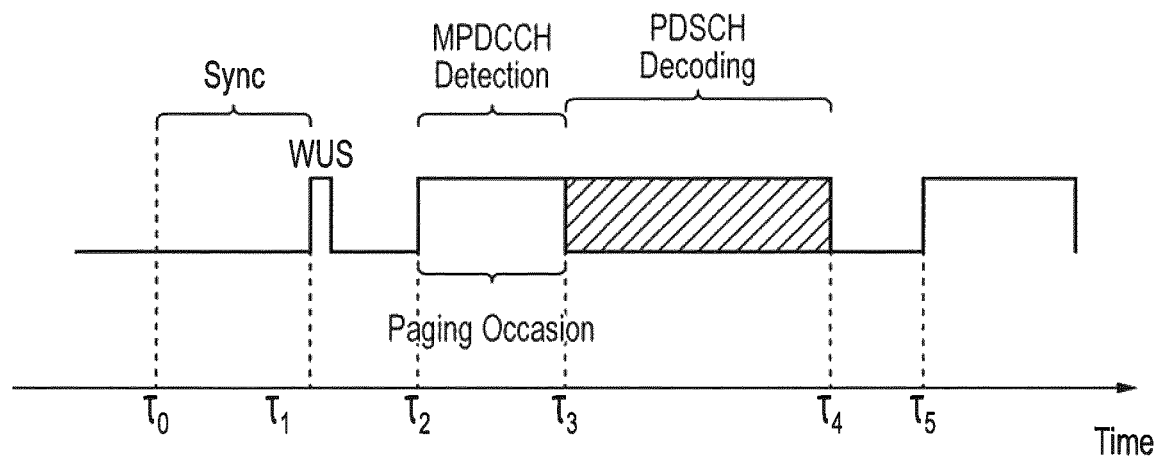
FIG. 8 provides a graphical illustration of another timing diagram representing a wake up signal transmitted with respect of a paging occasion according to a previously proposed arrangement.

FIG. 8 schematically represents a timeline for a paging occasion for a communications device operating in a wireless telecommunications system employing a WUS as proposed in association with 3GPP Release 15. In the example shown in FIG. 8, a paging occasion (PO) extends from time τ2 to τ3. As is conventional, the PO will typically occur according to a regular repeating schedule having regard to the communications device's currently configured DRX cycle.

As schematically indicated in FIG. 8, a WUS is transmitted at a predetermined/derivable time τ1 in advance of the paging occasion to indicate there is a MPDCCH paging message transmission for a communications device indicated by an identifier associated with the WUS (the identifier could identify an individual communications device or a group of communications devices). The WUS can indicate that the UE should wake up in order to read the paging occasion. Here, upon detection of a WUS, the UE will proceed to fine tune its frequency and timing tracking loops if required, and blind detects for a MPDCCH between time $\tau_2$ and $\tau_3$, followed by decoding of the PDSCH carrying the paging message between time $\tau_3$ and $\tau_4$. If the UE fails to detect a WUS, it will go back to sleep and skip detecting for the MPDDCH. Hence, by using WUS, the UE will consume less energy by avoiding unnecessary monitoring of MPDCCHs.

Figure 9:
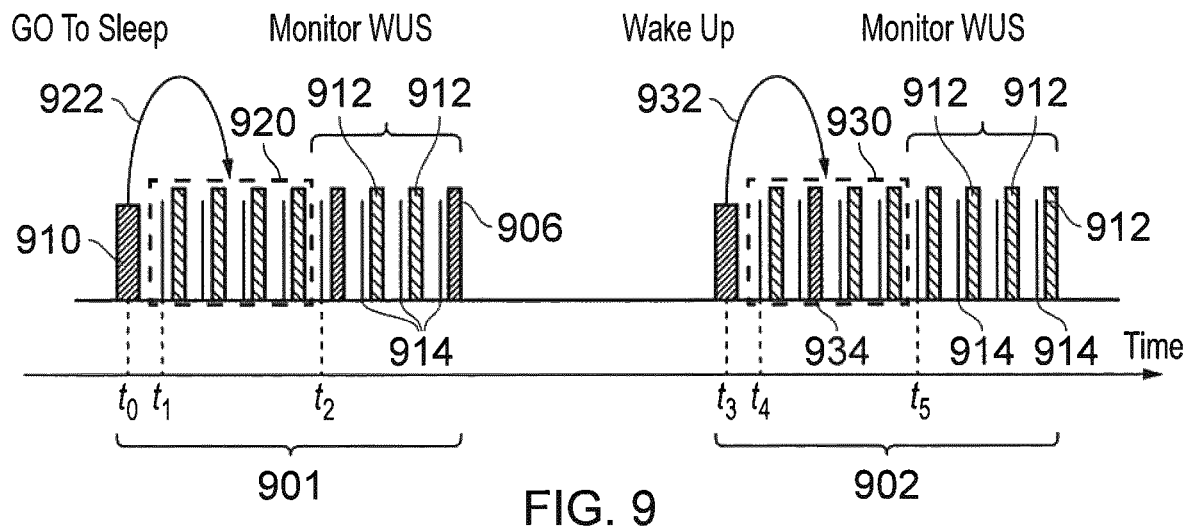
FIG. 9 provides a graphical illustration representing an example in which eSS are transmitted before paging timing windows and are used to convey WUS related information indicating that a communications device should wake-up to detect signals with paging occasions of the paging timing windows according to another example embodiment.

According to the example embodiment shown in FIG. 9, the eSS can provide wake-up signal related information. According to some example embodiments the eSS indicates whether the WUS should be monitored in parts of the paging timing window, for example the eSS indicates to the UE whether WUS should be monitored in dashed boxes 920 and 930. As shown by the example embodiment shown in FIG. 9, the boxes arranged along the horizontal access show relative periods within which the UE can take certain actions relating to the paging of the UE on the downlink transmissions from the eNodeB. As shown in FIG. 9 two paging time windows 901, 902 are shown to include in each eight paging occasions. The paging occasions include active paging occasions for the UE and inactive paging occasions. The inactive paging occasions are shown by the lighter coloured boxes 914 whereas the active paging occasions are shown by the darker colour boxes 906. In accordance with the present embodiment the eSS is shown by a dark coloured box 910, 912 before the paging time windows 901, 902. As well as providing a vehicle for transmitting the PCID, the eSS also transmits as additional information an indication that the UE should monitor one or more of the paging timing windows for paging occasions within the paging time window 901 as shown in FIG. 9. The eSS 910 provides an indication that the UE should wake up and monitor the first four of the paging occasions within the paging time window 901 shown by dashed box 920 and an arrow 922. The second transmission of the eSS 912 indicates for the paging time window 902 that the UE should wake up and monitor the four paging occasions shown within the dash box 930 and indicated by the arrow 932. Within the first paging time window 901, paging occasions indicated by the eSS 910 do not include any active paging occasions. However, within the second paging time window 902 within the first four paging occasions identified by the eSS 912 there is an active paging occasion 934. Accordingly the UE is directed by the eSS to monitor the first four paging occasions 930 of the paging time window 902 and within a second of those paging occasions 934 the eNodeB will transmit on the downlink a paging message within the paging occasion 934.

Before each of the paging occasions there is transmitted a conventional WUS 914.

As will be appreciated from the above description, the WUS related information indicates whether the UE needs to monitor N paging occasions (POs) within a paging timing window (PTW). According to an example embodiment an eSS is used to provide a WUS or WUS related information. Similarly to the example embodiment of the MIB/SIB change indication, a five hundred and fifth ($505^{th}$) state or five hundred and five (505) sequences are required instead of one thousand and eight (1008) sequences to indicate this WUS related information and the PCID. According to one example, if the UE detects the eSS using a sequence/state representing the PCID then the UE would monitor for the WUS in these N POs. If the UE detects the 505th state, which is a sequence representing an additional or second type of information which is the WUS related information, then it can skip monitoring these N POs. If the UE fails to detect the eSS using either of the sequences, then the UE has lost sync and/or moved out of the serving cell coverage. It will then revert back to detecting the PSS, SSS and if it has changed cell it will also decode the MIB/SIB. It will be appreciated that this is one example implementation and other implementations are possible, for example, in another implementation, the five hundred and five states can be used indicate to the UE to read the paging occasion.

Access Barring Example

In another example embodiment, the additional or second type of information can be used to indicate Access Barring. Access Barring is a technique in which a cell indicates that UEs or certain classes of UEs are barred from access the cell. In other words, the UE cannot transmit a random access message on this cell. If the UE successfully detects the eSS using the sequence or state representing the Access Barring then it will refrain from performing a random access process including transmitting a RACH. There is also no point monitoring any POs since the cell is barred.

In another embodiment, the eSS sequence or combination of base sequence and cover code representing the additional or second type of information is pre-specified in accordance with a predetermined operation (specifications). The sequence/state representing the additional or second of information can be a function of the PCID. That is to say the additional or second type of information need not be represented by the five hundred and fifth ($505^{th}$) state as described above but instead can be for example the third ($3^{rd}$) state in PCID 2 and seventh ($7^{th}$) state in PCID 47. This has a benefit that successful detection of the additional or second type of information would automatically provide a level of verification of the PCID. That is if each cell ID uses a different sequence/state to present the additional or second type of information, the UE would attempt to decode the eSS using two sequences/states, one representing the PCID and another representing the additional or second type of information and the PCID. According to one example, the UE can use an additional signaling indication narrow down potential PCIDs. For example if there are 512 states in total and 512−504=8 additional states providing eight other signalling indications then knowing that the PCID belongs to one of eight sets could help the UE when subsequently trying to decode the "first type of information". Accordingly, the UE could for example reduce the number of PCID hypotheses from 504 to 504/8=63 hypotheses.

In the previous embodiment of using a different sequence in a different cell to represent the additional or second type of information has the disadvantage that the neighbour cell PCID may be represented by the same sequence used for the additional or second type of information by the serving cell. Hence, in another embodiment, the eSS configurations of the neighbour cells are signalled to the UE via SIB broadcast or UE specific RRC signaling. This will tell the UE whether the neighbour's sequence uses the same sequence as that of the additional or second type of information in the serving cell. A neighbouring cell can also use a different narrowband for the eSS to avoid confusion and interference with the sequence representing the additional or second type of information in the serving cell. Again the sequence, narrowband, periodicity and time resources of the eSS of the neighbor cell can be signalled to the UE in the SIB or via UE specific signaling.

In an embodiment such as the one above, the wireless communications network can create a reuse pattern for the additional or second type of information. For example for a tri-sectored site, one sector can use state-505, one sector can use state-506 and the other sector can use state-507 for the additional or second information. Neighbouring cells would then be arranged such that the sector using state-505 in one cell is not adjacent to the sector using state-505 in the adjacent cell.

In another embodiment, the eSS sequence or combination of base sequence and cover code representing the additional or second type of information is RRC signalled to the UE via the SIBs or via UE specific RRC signaling (when the UE is first connected).

As will be appreciated from the description of the embodiments multiple types of information can be carried in the eSS. That is to say that in some embodiments, the eSS can indicate a three or more types of information. For example, the eSS can have five hundred and eight (508) sequences representing five hundred and four (504) PCIDs, MIB/SIB change, WUS related information and Access Barring. The UE would therefore need to monitor four different types of sequences for four different types of information. The number of types of information that the UE needs to monitor can be for example configured by the network via SIB broadcast or UE specific RRC signaling.

Figure 10:
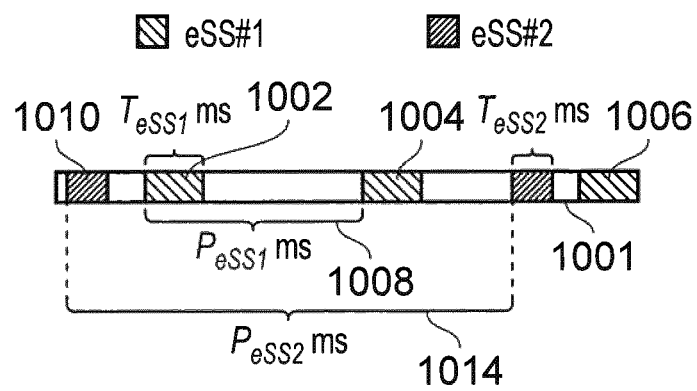
FIG. 10 is a graphical representation illustrating a transmission of different versions of eSS carrying different types of information with a different periodicity.

In another embodiment, multiple eSS occupying different narrowbands or time resource/periodicity can be configured such that each eSS indicates different types of information. In FIG. 10 two different types of eSS are shown to transmit information, which are used to gain synchronisation as well as identifying the PCID. As shown in FIG. 10 a horizontal box 1001 illustrates transmission in a time dimension along a horizontal axis. Within the box 1001 different eSS are transmitted. In lightly shaded boxes 1002 to 1006 a first eSS #1 is transmitted with a first periodicity 1008. Correspondingly within dark coloured shaded boxes 1010, 1012 with a periodicity 1014 a second type of eSS #2 signal is transmitted. According to this example embodiment the different types of eSS can carry different types of additional information in addition to the PCID. For example in FIG. 10, two types of eSS are configured, namely, eSS #1 and eSS #2, where eSS #1 has duration $T_{eSS1}$ and periodicity $P_{eSS1}$ whilst eSS #2 has duration $T_{eSS2}$ and periodicity $P_{eSS2}$. eSS #1 can indicate PCID and MIB/SIB change with 505 sequences whilst eSS #2 can indicate WUS related information and Access Barring with two additional sequences (i.e. with 506 sequences). These two additional sequences used by these two eSS can be configured by the network, e.g. they can be configured to be the same.

In summary, example embodiments of the present technique can provide a method of operating an infrastructure equipment in a wireless communications network, the method comprising providing a wireless access interface by the infrastructure equipment to form a cell of the wireless communications network, the infrastructure equipment forming part of a radio access network of the wireless communications network, transmitting with a first periodicity with respect to a time divided structure of the wireless access interface a first synchronisation signal to the communications devices within the cell formed by the infrastructure equipment, the first synchronisation signal being configured to carry a first indication of an identifier of the cell which is detectable by one or more communications devices for acquiring synchronisation with the time divided structure of the wireless access interface, and transmitting with a second periodicity with respect to the time divided structure of the wireless access interface an enhanced synchronisation signal within the cell, the enhanced synchronisation signal being configured to carry a second indication of the identifier of the cell which is detectable by the communications devices for acquiring synchronisation with the time divided structure of the wireless access interface, wherein the second periodicity is different to the first periodicity and the enhanced synchronisation signal is formed from one of a set of detectable sequences, each detectable sequence of the set representing one of a set of possible cell identifiers or one or more other signalling indications for the communications devices.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment in a wireless communications network, the method comprising providing a wireless access interface by the infrastructure equipment to form a cell of the wireless communications network, the infrastructure equipment forming part of a radio access network of the wireless communications network, transmitting with a first periodicity with respect to a time divided structure of the wireless access interface a first synchronisation signal to the communications devices within the cell formed by the infrastructure equipment, the first synchronisation signal being configured to carry a first indication of an identifier of the cell which is detectable by one or more communications devices for acquiring synchronisation with the time divided structure of the wireless access interface, and transmitting with a second periodicity with respect to the time divided structure of the wireless access interface an enhanced synchronisation signal within the cell, the enhanced synchronisation signal being configured to carry a first type of information which is detectable by the communications devices for acquiring synchronisation with the time divided structure of the wireless access interface, wherein the second periodicity is different to the first periodicity and the enhanced synchronisation signal is formed from one of a set of detectable sequences, each detectable sequence of the set representing one of a set of possible values of the first type of information or one or more other signalling indications for the communications devices.

Paragraph 2. A method according to paragraph 1, comprising transmitting system information by the infrastructure equipment periodically via the wireless access interface to the communications devices in accordance with the time divided structure, the system information being for use by the communications devices to configure a transmitter or a receiver the communications terminals to transmit data to or to receive data from the wireless access interface provided by the infrastructure equipment, wherein the one or more other signalling indications for the communications devices provided by the one or more of the detectable sequences of the set includes an indication as to whether or not the system information has changed with respect to a previous transmission of the system information.

Paragraph 3. A method according to paragraph 2, wherein the transmitting the system information by the infrastructure equipment periodically via the wireless access interface comprises transmitting a master information block and transmitting one or more other system information blocks each providing different types of the system information for the communications devices, and the one or more other signalling indications for the communications devices include an indication as to whether or not at least one of the system information transmitted in the master information block or the system information transmitted in one or more of the other system information blocks has changed with respect to a previous transmission of the system information.

Paragraph 4. A method according to paragraph 1, wherein the one or more other signalling indications for the communications devices provided by one or more of the detectable sequences of the set includes an indication relating a configuration of wake-up signals, the indication indicating to the communications devices that one or more of the communications devices should detect one or more paging signals in one or more paging occasions of a paging timing window.

Paragraph 5. A method according to paragraph 1, wherein the one or more other signalling indications for the communications devices provided by one or more of the detectable sequences of the set includes an indication of an access class bar representing a class of the communications devices which is barred from performing a random access procedure including transmitting a random access preamble to the infrastructure equipment.

Paragraph 6. A method according to any of paragraphs 1 to 5, wherein the transmitting with the second periodicity with respect to the time divided structure the enhanced synchronisation signal to the communications devices within the cell includes transmitting a plurality of different versions of the enhanced synchronisation signal, each version of the enhanced synchronisation signal being formed from a different sub-set of the set of detectable sequences, each of the different sub-sets of the detectable sequences including detectable sequences representing each of the set of possible cell identifiers, and each of the different sub-sets of the detectable sequences including detectable sequences representing at least one of the one or more other signalling indications which is different to the other sub-sets.

Paragraph 7. A method according to paragraph 6, wherein the transmitting the plurality of different versions of the enhanced synchronisation signal includes transmitting each version of the enhanced synchronisation signal with a different number of times within the second periodicity.

Paragraph 8. A method according to paragraph 7, wherein the different number of times of transmission of the different versions of the enhanced synchronisation sequence corresponds to a likelihood of the different one of the one or more other signalling indication changing with respect to a previous transmission.

Paragraph 9. A method according to any of paragraphs 1 to 8, wherein the second periodicity with which the enhanced synchronisation signal is transmitted is configurable by the infrastructure equipment.

Paragraph 10. A method according to any of paragraphs 1 to 9, wherein the second periodicity is less than the first periodicity and the enhanced synchronisation is transmitted more frequently than the first synchronisation signal whereby the communications devices may re-synchronise in shorter time than a time to acquire synchronisation with respect to the first synchronisation signal.

Paragraph 11. A method according to any of paragraphs 1 to 10, wherein the first type of information is a second indication of an identifier of the cell, the set of possible values of the first type of information being a set of possible cell identifiers.

Paragraph 12. An infrastructure equipment for forming part of a radio access network of a wireless communications network, the infrastructure equipment comprising transmitter circuitry configured to transmit signals via a wireless access interface of a cell of the wireless communications network formed by the infrastructure equipment, receiver circuitry configured to receive signals transmitted via the wireless access interface of the cell formed by the infrastructure equipment, and controller circuitry configured to control the transmitter to transmit with a first periodicity with respect to a time divided structure of the wireless access interface a first synchronisation signal to the communications devices within the cell formed by the infrastructure equipment, the first synchronisation signal being configured to carry a first indication of an identifier of the cell which is detectable by the communications devices for acquiring synchronisation with the time divided structure of the wireless access interface, and to transmit with a second periodicity with respect to the time divided structure of the wireless access interface an enhanced synchronisation signal to the communications devices within the cell, the enhanced synchronisation signal being configured to carry a first type of information which is detectable by the communications devices for acquiring synchronisation with the time divided structure of the wireless access interface, wherein the second periodicity is different to the first periodicity and the enhanced synchronisation signal is formed from one of a set of detectable sequences, each detectable sequence of the set representing one of a set of possible values of the first type of information or one or more other signalling indications for the communications devices.

Paragraph 13. A method of operating a communications device to transmit data to or to receive data from a wireless communications network, the method comprising detecting a first synchronisation signal at the communications device received via a wireless access interface of a cell of the wireless communications network, the first synchronisation signal being transmitted with a first periodicity with respect to a time divided structure of the wireless access interface, the first synchronisation signal being configured to carry an indication of an identifier of the cell, generating a first estimate of the cell identifier carried by the first synchronisation signal, configuring a transmitter of the communications device to transmit data to the wireless communications network and configuring a receiver of the communications device to receive data from the wireless communications network based on the first estimated cell identifier, detecting an enhanced synchronisation signal received via the wireless access interface with a second periodicity with respect to the time divided structure of the wireless access interface, the enhanced synchronisation signal being formed from one of a set of detectable sequences, each detectable sequence of the set representing one of a set of possible values or one or more other signalling indications for the communications device, detecting from the enhanced synchronisation signal one of the detectable sequences from which the enhanced synchronisation signal has been formed, and using the detected sequence from the enhanced synchronisation signal to re-configure one or both of the transmitter and the receiver of the communications device to transmit data to the wireless communications network or to receive data from the wireless communications network.

Paragraph 14. A method according to paragraph 13, wherein the detectable sequence of the enhanced synchronisation sequence is one of a possible set of cell identifiers and the re-configuring one or both of the transmitter and the receiver of the communications device includes one of using the detected sequence from which the enhanced synchronisation signal has been formed either to confirm the estimate of the cell identifier, or to determine that the cell identifier identified from the detected sequence from which the enhanced synchronisation signal has been formed is different from the first estimated cell identifier, and if the cell identifier is determined to be different to the first estimate of the cell identifier, to re-configure the transmitter and the receiver of the communications device to transmit data to the wireless communications network or to receive data from the wireless communications network based on the different cell identifier.

Paragraph 15. A method according to paragraph 13, wherein the one or more other signalling indications for the communications devices provided by one or more of the detectable sequences of the set includes an indication as to whether or not system information for the cell has changed with respect to a previous transmission of the system information, the system information being transmitted periodically by the infrastructure equipment via the wireless access interface for the cell, and the re-configuring one or both of the transmitter and the receiver of the communications device includes using the detected sequence from which the enhanced synchronisation signal has been formed to detect that the system information for the cell has changed to new system information, detecting one or more system information blocks carrying the new system information transmitted by the infrastructure equipment, determining the new system information from the one or more detected system information blocks, and re-configuring the transmitter or the receiver based on the new system information to transmit the data to the wireless communications network or to receive the data from the wireless communications network.

Paragraph 16. A method according to paragraph 15, wherein the detecting the one or more system information blocks carrying the new system information transmitted by the infrastructure equipment includes assuming that a cell identifier for the cell from which the enhanced synchronisation sequence was received has not changed from a last detected cell identifier, and using the last detected cell identifier to detect the one or more system information blocks carrying the new system information.

Paragraph 17. A method according to paragraph 16, wherein the system information is transmitted by the infrastructure equipment in a master information block and one or more other system information blocks each providing different types of the system information for the communications devices, the one or more other signalling indications represented by the one of more detectable sequences from which the enhanced synchronisation signal is formed including an indication as to whether or not at least one of the different types of the system information transmitted in the master information block or the system information transmitted in one or more of the other system information blocks has changed with respect to a previous transmission of the system information, and the using the detected sequence from which the enhanced synchronisation signal has been formed to detect that the system information for the cell has changed to new system information includes using the detected sequence from which the enhanced synchronisation signal has been formed to determine that one or more of the different types of the system information carried by one or more of the master information block or one or more of the other system information blocks for the cell has changed to new system information, detecting one or more master information block or one or more of the other system information blocks carrying the new system information transmitted by the infrastructure equipment which have changed, determining the new system information from the one or more detected master information block or one or more of the other system information blocks, and re-configuring the transmitter or the receiver based on the new system information for the different type of system information to transmit the data to the wireless communications network or to receive the data from the wireless communications network.

Paragraph 18. A method according to paragraph 16, wherein the one or more other signalling indications for the communications devices provided by one or more of the detectable sequences of the set represent an indication relating a configuration of wake-up signals, the indication indicating that the communications device should monitor one or more paging occasions of a paging window for one or more paging signals, and the re-configuring one or both of the transmitter and the receiver of the communications device includes re-configuring the receiver to detect one or more paging signals transmitted by the infrastructure equipment in the one or more paging occasions of the paging window. Paragraph 19. A method according to paragraph 16, wherein the one or more other signalling indications for the communications devices provided by one or more of the detectable sequences of the set indicates an access class bar representing a class of communications devices which is barred from performing a random access procedure including transmitting a random access preamble to the infrastructure equipment, and the re-configuring one or both of the transmitter and the receiver of the communications device includes re-configuring the transmitter to transmit a random access preamble according to a random access procedure if the communications device is not barred from accessing the cell by the access class bar, or re-configuring the transmitter not to transmit a random access preamble according to a random access procedure if the communications device is barred from accessing the cell by the access class bar.

Paragraph 20. A method according to paragraph 14, wherein the detecting the enhanced synchronisation signal transmitted by the infrastructure equipment via the wireless access interface with the second periodicity includes detecting a plurality of different versions of the enhanced synchronisation signal, each version of the enhanced synchronisation signal being formed from a different sub-set of the set of detectable sequences, each of the different sub-sets of the detectable sequences including detectable sequences representing each of the set of possible cell identifiers, and each of the different sub-sets of the detectable sequences including detectable sequences representing at least one of the one or more other signalling indications which is different to the other sub-sets.

Paragraph 21. A method according to any of paragraphs 12 to 20, wherein the first type of information is an indication of an identifier of the cell, the set of possible values of the first type of information being a set of possible cell identifiers and if the enhanced synchronisation sequence carries one of the possible sequences representing one of the cell identifiers, the re-configuring the transmitter and the receiver of the communications device includes re-configuring the transmitter or the receiver based one the cell identifier to detect other signalling information.

Paragraph 22. A communications device for transmitting data to or receiving data from a wireless communications network, the communications device comprising transmitter circuitry configured to transmit signals via a wireless access interface of a cell of the wireless communications network, receiver circuitry configured to receive signals transmitted via the wireless access interface of the cell, and controller circuitry configured in combination with the receiver circuitry and the receiver circuitry to detect a first synchronisation signal at the communications device received via a wireless access interface of a cell of the wireless communications network, the first synchronisation signal being transmitted with a first periodicity with respect to a time divided structure of the wireless access interface, the first synchronisation signal being configured to carry an indication of an identifier of the cell, to generate a first estimate the cell identifier carried by the first synchronisation signal, to configure a transmitter of the communications device to transmit data to the wireless communications network and to configure a receiver of the communications device to receive data from the wireless communications network based on the first estimated cell identifier, to detect an enhanced synchronisation signal received via the wireless access interface with a second periodicity with respect to the time divided structure within the cell, the enhanced synchronisation signal being formed from one of a set of detectable sequences, each detectable sequence of the set representing one of a set of possible cell identifiers or one or more other signalling indications for the communications device, to detect from the enhanced synchronisation signal one of the detectable sequences from which the enhanced synchronisation signal has been formed, and to use the detected sequence from the enhanced synchronisation signal to re-configure one or both of the transmitter and the receiver of the communications device to transmit data to the wireless communications network or to receive data from the wireless communications network.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, RAN #73
[2] RP-161901, "Revised work item proposal: Enhancements of NB-IoT", Huawei, HiSilicon, RAN #73
[3] RP-170732, "New WID on Even further enhanced MTC for LTE," Ericsson, Qualcomm, RAN #75
[4] RP-170852, "New WID on Further NB-IoT enhancements," Huawei, HiSilicon, Neul, RAN #75

[5] White Paper "Coverage Analysis of LTE-M Category-M1" Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2016
[6] R1-1716995, "Reduced system acquisition time for MTC," Ericsson
[7] EP17169821.0
[8] EP17193861.6
[9] EP18157017.7
[10] EP18157021.9
[11] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.
[12] European patent application no. EP17186065.
[13] Holma H. and Toskala A, "LTE for UMTS OFDMA and SC-FDMA based radio access", John Wiley and Sons, 2009.

What is claimed is:

1. A method of operating an infrastructure equipment in a wireless communications network, the method comprising:
providing a wireless access interface by the infrastructure equipment to form a cell of the wireless communications network, the infrastructure equipment forming part of a radio access network of the wireless communications network,
transmitting system information by the infrastructure equipment periodically via the wireless access interface to communication devices in accordance with a time divided structure of the wireless access interface, the system information being used for use by the communications devices to configure a transmitter or a receiver of the communications devices to transmit data to or to receive data from the wireless interface provided by the infrastructure equipment,
transmitting with a first periodicity with respect to the time divided structure of the wireless access interface a first synchronisation signal to the communications devices within the cell formed by the infrastructure equipment, the first synchronisation signal being configured to carry a first indication of a Physical Cell Identifier (PCID) of the cell which is detectable by one or more communications devices for acquiring synchronisation with the time divided structure of the wireless access interface, and
transmitting with a second periodicity with respect to the time divided structure of the wireless access interface an enhanced synchronisation signal within the cell, the enhanced synchronisation signal being configured to carry a second indication of the PCID of the cell or one or more other signalling indications for the communications devices and is detectable by the communications devices for acquiring synchronisation with the time divided structure of the wireless access interface, wherein
the second periodicity is less than the first periodicity,
the enhanced synchronisation signal is transmitted more frequently than the first synchronisation signal whereby the communications devices are re-synchronisable in shorter time than a time to acquire synchronisation with respect to the first synchronisation signal,
the enhanced synchronisation signal is formed from one of a set of detectable sequences, each detectable sequence of the set representing one of a set of possible PCIDs or the one or more other signalling indications for the communications devices, and
when the one or more other signalling indications for the communications devices provided by one or more of the detectable sequences of the set are transmitted, the one or more other signalling indications includes an indication as to whether or not the system information has changed with respect to a previous transmission of the system information.

2. A method as claimed in claim 1,
wherein the enhanced synchronisation signal is configured to carry the one or more other signalling indications for the communications devices, and
wherein the transmitting the system information by the infrastructure equipment periodically via the wireless access interface comprises transmitting a master information block and transmitting one or more other system information blocks each providing different types of the system information for the communications devices, and the one or more other signalling indications for the communications devices, when transmitted, include an indication as to whether or not at least one of the system information transmitted in the master information block or the system information transmitted in one or more of the other system information blocks has changed with respect to a previous transmission of the system information.

3. A method as claimed in claim 1,
wherein the enhanced synchronisation signal is configured to carry the one or more of signalling indications for the communications devices, and
wherein the one or more other signalling indications for the communications devices provided by one or more of the detectable sequences of the set, when transmitted, includes an indication relating a configuration of wake-up signals, the indication indicating to the communications devices that one or more of the communications devices should detect one or more paging signals in one or more paging occasions of a paging timing window.

4. A method as claimed in claim 1,
wherein the enhanced synchronisation signal is configured to carry the one or more other signalling indications for the communications devices, and
wherein the one or more other signalling indications for the communications devices provided by one or more of the detectable sequences of the set, when transmitted, includes an indication of an access class bar representing a class of the communications devices which is barred from performing a random access procedure including transmitting a random access preamble to the infrastructure equipment.

5. A method as claimed in claim 1, wherein the transmitting with the second periodicity with respect to the time divided structure the enhanced synchronisation signal to the communications devices within the cell includes transmitting a plurality of different versions of the enhanced synchronisation signal, each version of the enhanced synchronisation signal being formed from a different sub-set of the set of detectable sequences, each of the different sub-sets of the detectable sequences including detectable sequences representing a sub-set of possible PCIDs, and each of the different sub-sets of the detectable sequences including detectable sequences representing at least one of the one or more other signalling indications which is different to the other sub-sets.

6. A method as claimed in claim 5, wherein the transmitting the plurality of different versions of the enhanced synchronisation signal includes transmitting each version of the enhanced synchronisation signal with a different number of times within the second periodicity.

7. A method as claimed in claim 6, wherein the different number of times of transmission of the different versions of the enhanced synchronisation sequence corresponds to a likelihood of the different at least one of the one or more other signalling indication changing with respect to a previous transmission.

8. A method as claimed in claim 1, wherein the second periodicity with which the enhanced synchronisation signal is transmitted is configurable by the infrastructure equipment.

9. An infrastructure equipment for forming part of a radio access network of a wireless communications network, the infrastructure equipment comprising:
    transmitter circuitry configured to transmit signals via a wireless access interface of a cell of the wireless communications network formed by the infrastructure equipment,
    receiver circuitry configured to receive signals transmitted via the wireless access interface of the cell formed by the infrastructure equipment, and
    controller circuitry configured to control the transmitter
        to transmit system information periodically via the wireless access interface to communication devices in accordance with a time divided structure of the wireless access interface, the system information being used for use by one or more communications devices to configure a transmitter or a receiver of each of the one or more communications devices to transmit data to or to receive data from the wireless access interface provided by the infrastructure equipment,
        to transmit with a first periodicity with respect to the time divided structure of the wireless access interface a first synchronisation signal to the communications devices within the cell formed by the infrastructure equipment, the first synchronisation signal being configured to carry a first indication of a Physical Cell Identifier (PCID) of the cell which is detectable by the communications devices for acquiring synchronisation with the time divided structure of the wireless access interface, and
        to transmit with a second periodicity with respect to the time divided structure of the wireless access interface an enhanced synchronisation signal to the communications devices within the cell, the enhanced synchronisation signal being configured to carry a second indication of the PCID of the cell or one or more other signalling indications for the communications devices and is detectable by the communications devices for acquiring synchronisation with the time divided structure of the wireless access interface, wherein
    the second periodicity is less than the first periodicity,
    the enhanced synchronisation signal is transmitted more frequently than the first synchronisation signal whereby the communications devices are re-synchronisable in shorter time than a time to acquire synchronisation with respect to the first synchronisation signal,
    the enhanced synchronisation signal is formed from one of a set of detectable sequences, each detectable sequence of the set representing one of a set of possible PCIDs or the one or more other signalling indications for the communications devices, and
    when the one or more other signalling indications for the communications devices provided by one or more of the detectable sequences of the set are transmitted, the one or more other signalling, indications includes an indication as to whether or not the system information has changed with respect to a previous transmission of the system information.

10. An infrastructure equipment as claimed in claim 9,
    wherein the enhanced synchronisation signal is configured to carry the one or more other signalling indications for the communications devices, and
    wherein the transmitting the system information by the infrastructure equipment periodically via the wireless access interface comprises transmitting a master information block and transmitting one or more other system information blocks each providing different types of the system information for the communications devices, and the one or more other signalling indications for the communications devices, when transmitted, include an indication as to whether or not at least one of the system information transmitted in the master information block or the system information transmitted in one or more of the other system information blocks has changed with respect to a previous transmission of the system information.

11. An infrastructure equipment as claimed in claim 9,
    wherein the enhanced synchronisation signal is configured to carry the one or more other signalling indications for the communications devices, and
    wherein the one or more other signalling indications for the communications devices provided by one or more of the detectable sequences of the set, when transmitted, includes an indication relating a configuration of wake-up signals, the indication indicating to the communications devices that one or more of the communications devices should detect one or more paging signals in one or more paging occasions of a paging timing window.

12. An infrastructure equipment as claimed in claim 9,
    wherein the enhanced synchronisation signal is configured to carry the one or more other signalling indications for the communications devices, and
    wherein the one or more other signalling indications for the communications devices provided by one or more of the detectable sequences of the set, when transmitted, includes an indication of an access class bar representing a class of the communications devices which is barred from performing a random access procedure including transmitting a random access preamble to the infrastructure equipment.

13. An infrastructure equipment as claimed in claim 9, wherein the transmitting with the second periodicity with respect to the time divided structure the enhanced synchronisation signal to the communications devices within the cell includes transmitting a plurality of different versions of the enhanced synchronisation signal, each version of the enhanced synchronisation signal being formed from a different sub-set of the set of detectable sequences, each of the different sub-sets of the detectable sequences including detectable sequences representing a sub-set of possible PCIDs, and each of the different sub-sets of the detectable sequences including detectable sequences representing at least one of the one or more other signalling indications which is different to the other sub-sets.

14. An infrastructure equipment as claimed in claim 13, wherein the transmitting the plurality of different versions of the enhanced synchronisation signal includes transmitting each version of the enhanced synchronisation signal with a different number of times within the second periodicity.

15. An infrastructure equipment as claimed in claim 14, wherein the different number of times of transmission of the different versions of the enhanced synchronisation sequence corresponds to a likelihood of the different at least one of the one or more other signalling indication changing with respect to a previous transmission.

16. An infrastructure equipment as claimed in claim 9, wherein the second periodicity with which the enhanced synchronisation signal is transmitted is configurable by the infrastructure equipment.

* * * * *